US012773939B1

(12) United States Patent
Brown

(10) Patent No.: US 12,773,939 B1
(45) Date of Patent: Oct. 27, 2026

(54) FIXED RIGID DEBRIS CATCHER FOR A DUMP BODY

(71) Applicant: Charles N. Brown, Phoenix, AZ (US)

(72) Inventor: Charles N. Brown, Phoenix, AZ (US)

( * ) Notice: Subject to any disclaimer, the term of this patent is extended or adjusted under 35 U.S.C. 154(b) by 272 days.

(21) Appl. No.: 18/641,364

(22) Filed: Apr. 20, 2024

(51) Int. Cl.
*B60P 1/28* (2006.01)
*B60R 9/06* (2006.01)

(52) U.S. Cl.
CPC ................. *B60P 1/28* (2013.01); *B60P 1/283* (2013.01); *B60R 9/06* (2013.01)

(58) Field of Classification Search
CPC .......... B60P 1/28; B60P 1/283; B62D 33/023; B62D 33/027; B62D 33/0273; B60R 9/06
USPC ...... 298/1 R, 38; D12/15; 296/38, 183.2, 50
See application file for complete search history.

(56) References Cited

U.S. PATENT DOCUMENTS 2,679,335 A 5/1954 Bell
4,772,072 A 9/1988 Vick
5,046,774 A 9/1991 Stockell et al.
D480,333 S * 10/2003 Allison .......................... D12/15
6,929,329 B2 * 8/2005 Kent ......................... B60P 1/26 298/7
8,882,435 B2 * 11/2014 Daigle ............... B60H 1/00014 414/472
8,998,285 B2 4/2015 Bethel
9,126,541 B2 9/2015 Goldstein et al.
9,387,815 B2 7/2016 Goldstein et al.
10,315,552 B1 6/2019 Smith

FOREIGN PATENT DOCUMENTS

CN 105365644 A 3/2016

OTHER PUBLICATIONS

English translation of CN105365644A; https://translationportal.epo.org; Jun. 1, 2026 (Year: 2026).*

* cited by examiner

*Primary Examiner* — Roger L Pang
(74) *Attorney, Agent, or Firm* — David S. Alavi

(57) ABSTRACT

A debris catcher for a dump body comprises a transversely elongated rigid member rigidly attached thereto that extends across the rear opening of the dump body and is positioned rearward of the closed tailgate of the dump body. A debris-retention surface of the rigid member extends across the lower edge of the rear opening of the dump body. The rigid member and the debris-retention surface are arranged so that (i) with the dump body in a lowered driving position, the debris-retention surface retains debris between the closed tailgate and the debris-retention surface, and (ii) with the dump body in a raised dumping position, the debris-retention surface permits the contents of the dump body to slide out of the rear opening of the dump body over or past the rigid member.

21 Claims, 13 Drawing Sheets

FIXED RIGID DEBRIS CATCHER FOR A DUMP BODY

FIELD OF THE INVENTION

The field of the present invention relates to dump trucks. In particular, a fixed rigid debris catcher for a dump body is disclosed.

BACKGROUND

Some previous examples of a dump truck debris catcher are disclosed in:

- U.S. Pat. No. 2,679,335 entitled "Dribble gate" issued May 25, 1954 to Bell;
- U.S. Pat. No. 4,772,072 entitled "Dump body debris catcher" issued Sep. 20, 1988 to Vick;
- U.S. Pat. No. 5,046,774 entitled "Debris catcher" issued Sep. 10, 1991 to Stockell et al;
- U.S. Pat. No. 8,998,285 entitled "Dump truck tailgate debris bin" issued Apr. 7, 2015 to Bethel;
- U.S. Pat. No. 9,126,541 entitled "Apparatus for collection of debris escaping around a vehicle tailgate" issued Sep. 8, 2015 to Goldstein et al;
- U.S. Pat. No. 9,387,815 entitled "Apparatus for collection of debris escaping around a vehicle tailgate" issued Jul. 12, 2016 to Goldstein et al;
- U.S. Pat. No. 10,315,552 entitled "Debris retainment assembly" issued Jun. 11, 2019 to Smith; and
- CN 105365644 B entitled "Leakage-preventing dumper" issued Nov. 24, 2017 to Zhong et al (Sany Automobile Manufacturing Co Ltd).

SUMMARY

An inventive debris catcher for a dump body comprises a transversely elongated rigid member that is rigidly attached to the dump body. The rigid member extends at least partly across, or entirely across, a lower edge of a rear opening of the dump body, and is positioned rearward of the closed tailgate of the dump body. The rigid member has a debris-retention surface extending at least partly across, or entirely across, the lower edge of the rear opening of the dump body. The debris-retention surface is characterized by one or more surface-normal vectors. With the dump body in a lowered driving position, each of those surface-normal vectors has a corresponding non-zero horizontal component directed in a forward direction; with the dump body in a raised dumping position, each of those surface-normal vectors has a corresponding non-zero horizontal component directed in a rearward direction. As a result, the debris-retention surface is arranged so that (i) with the dump body in the lowered driving position, the rigid member retains debris between the closed tailgate and the debris-retention surface, and (ii) with the dump body in the raised dumping position, the debris-retention surface permits the contents of the dump body to slide out of the rear opening of the dump body over or past the rigid member.

An inventive method employing a truck with an inventive debris catcher comprises: (A) driving the truck including the dump body with (i) the dump body in the lowered driving position, (ii) the tailgate in the closed position, and (iii) a load of material in the dump body; (B) while driving the truck, retaining between the tailgate and the debris-retention surface at least some of the material of the load that leaks as debris out of the dump body past the tailgate; and (C) after driving the truck, dumping the material from the dump body by raising the dump body into the raised dumping position so that the material slides out of the rear opening of the dump body past the tailgate in an open position and over or past the rigid member.

Objects and advantages pertaining to truck dump bodies may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates by way of example, not by way of limitation, the principles of the inventive subject matter.

In the description and claims, all directions are defined with respect to a truck that includes a dump body mounted thereon in any suitable way to be operable as a dump truck. "Front", "forward", and so on refer to the front end of the truck where the driver compartment or cab is located, and to the direction in which the truck would normally be driven on a road between loading and/or dumping destinations. "Back", "rear", "rearward", and so on refer to the opposite, tail end of the truck where the open end of the dump body and its tailgate are located. "Horizontal" refers to directions parallel to level ground on which the truck sits, while "up", "upward", "vertical", and so on refer to the direction perpendicular to that level ground. A surface-normal vector is employed herein to designate the orientation of a surface, or a localized portion thereof, and refers to a vector perpendicular to that surface or localized portion thereof. A flat surface can be defined by a single surface-normal vector at all locations on that flat surface, while a curved surface is defined by surface-normal vectors that vary with location on the surface.

Figure 1A:
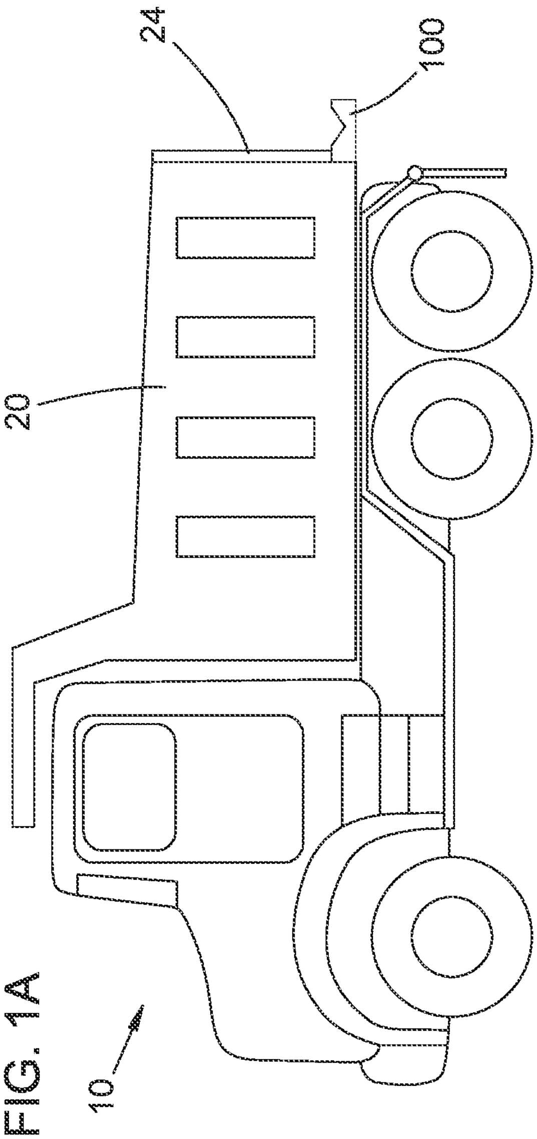
FIG. 1A is a schematic side view of an example dump truck with a dump body and inventive debris catcher in its lowered driving position.
Figure 1B:
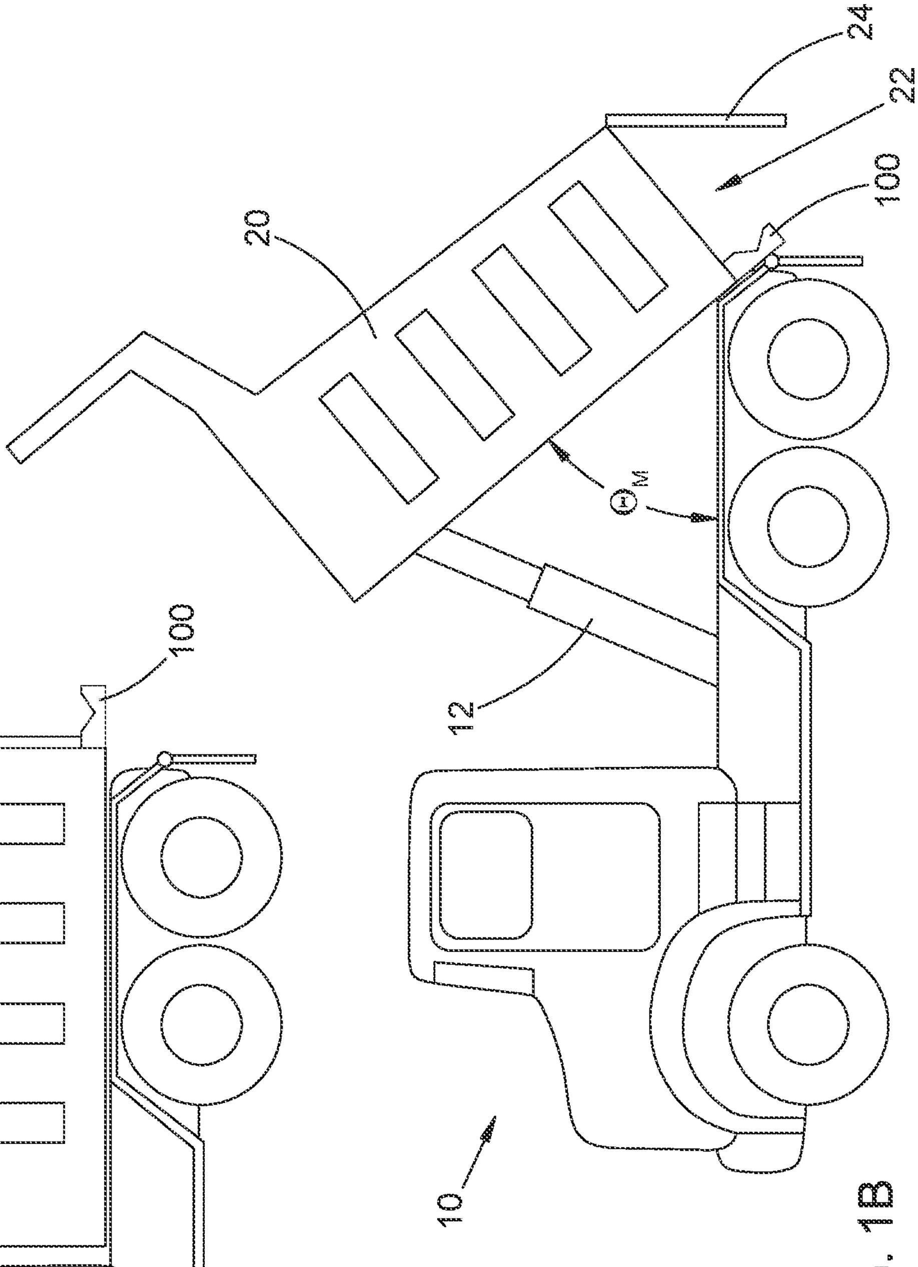
FIG. 1B is a schematic side view of the example dump truck with the dump body in its raised dumping position.
Figure 1C:
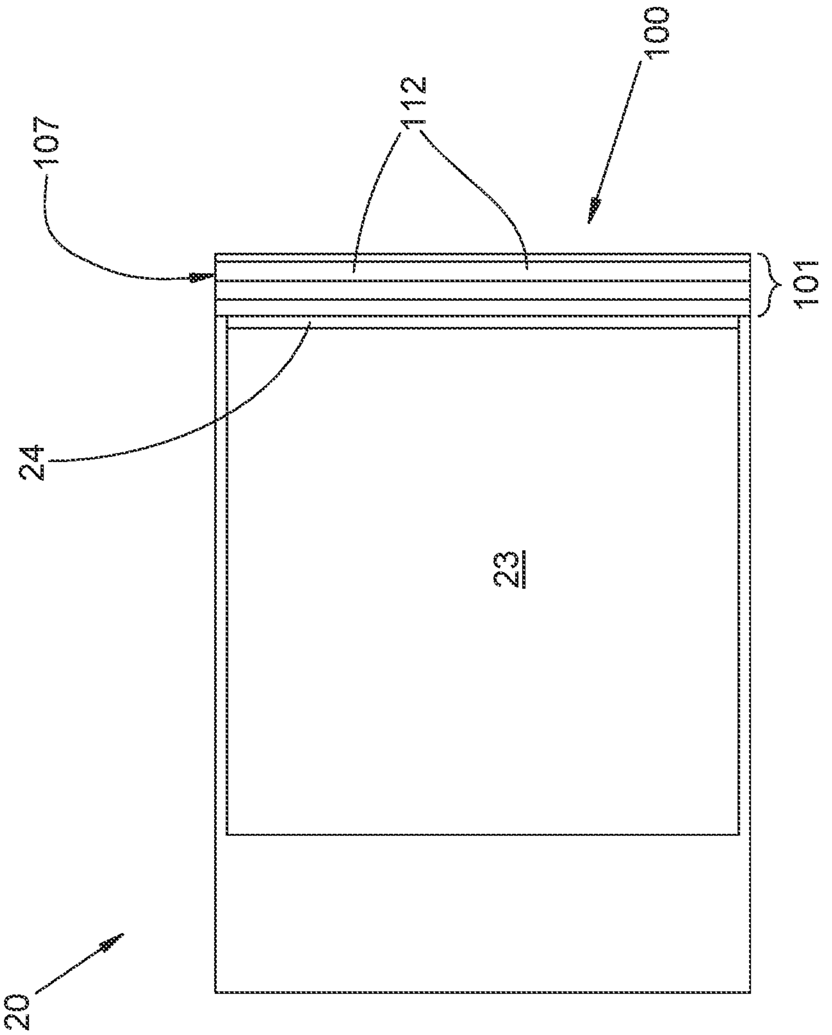
FIG. 1C is a schematic top view of the dump body of the example dump truck in its lowered driving position.
Figures 2A, 2B:
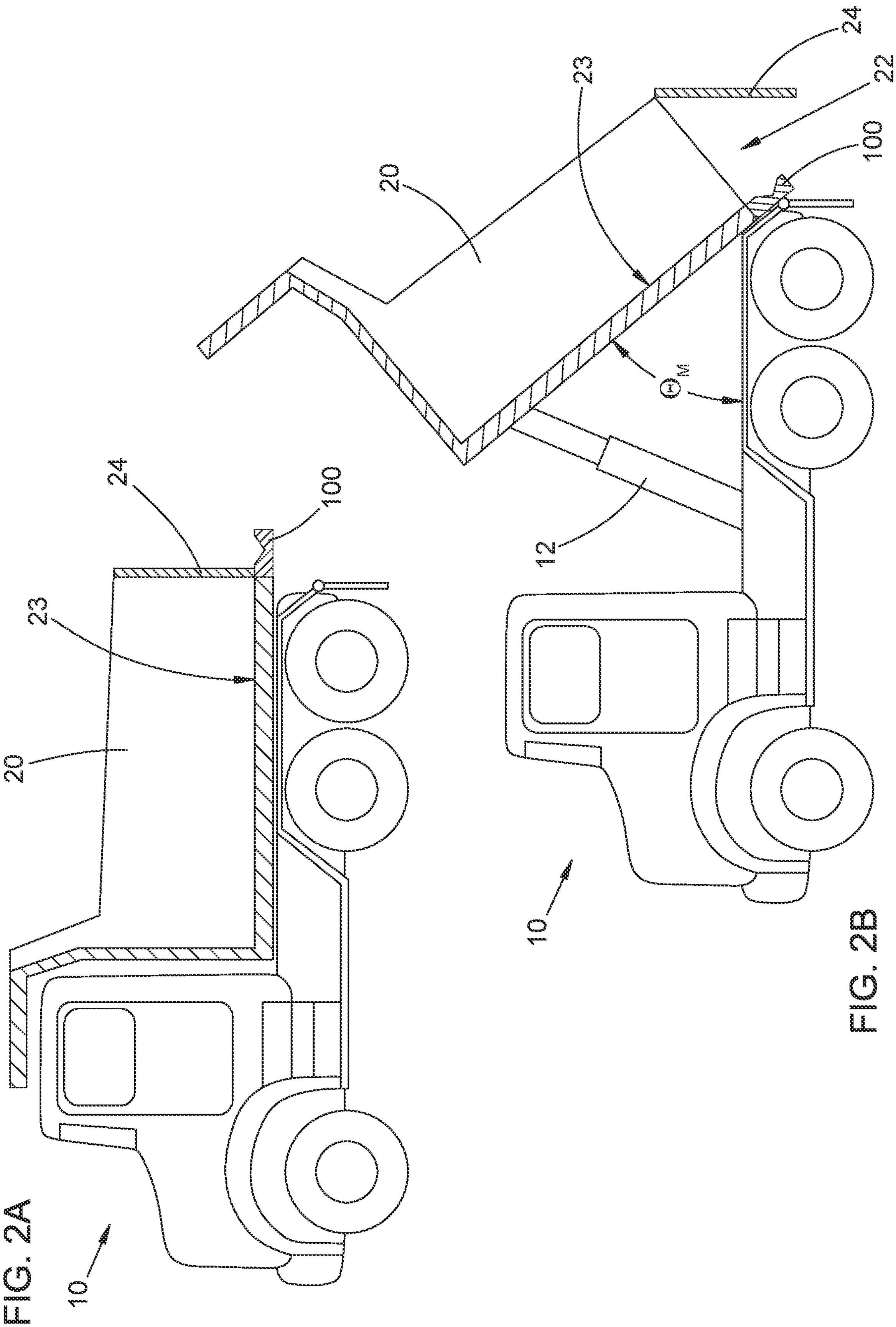
FIGS. 2A and 2B are schematic partial cross-sectional side views of the example dump truck of FIGS. 1A-1C with the dump body in its lowered driving position and its raised dumping position, respectively.

An example of a truck 10 with a dump body 20 is illustrated schematically in the side views of FIGS. 1A and 1B, the top view of FIG. 1C, and the partial cross-sectional side views of FIGS. 2A and 2B. The dump body 20 typically takes the form of a roughly rectangular box with an open top and a rear opening 22 (e.g., an open-box bed); the rear opening 22 can be an entirely open rear end of the roughly rectangular box. The lower surface of the roughly rectangular box is the bed portion 23 of the dump body 20. Material 99 to be transported is placed within the bump body 20 (e.g., as in FIG. 3A) on the bed portion 23, contained by the front and side walls of the dump body 20 and the tailgate 24 in its closed position (described further below). The dump body 20 is movable relative to the truck 10 between a lowered driving position (e.g., as in FIGS. 1A and 2A; so called because that is the position of the dump body 20 while the truck 10 is being driven on the road from one place to another) and a raised dumping position (e.g., as in FIGS. 1B and 2B; so called because that is the position that causes material 99 within the dump body 20 to be dumped out through the rear opening 22 under the influence of gravity, e.g., as in FIG. 3B). Movement between the lowered and raised positions is enabled by hinged or otherwise rotatable engagement between the dump body 20 and the frame of the truck 10, and is effected by an actuator of any suitable type or arrangement (e.g., a hydraulic piston 12 or other suitably arranged actuator, hydraulic or otherwise).

Figure 3A:
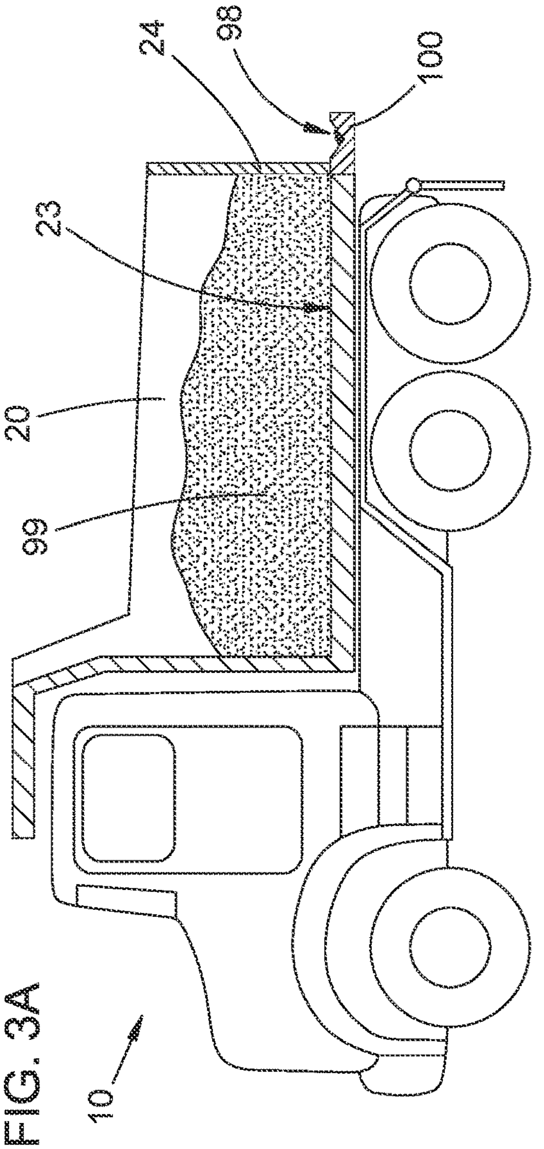
FIG. 3A is a schematic partial cross-sectional side view of the example dump truck of FIGS. 1A-1C with a load of material in the dump body in its lowered driving position.
Figure 3B:
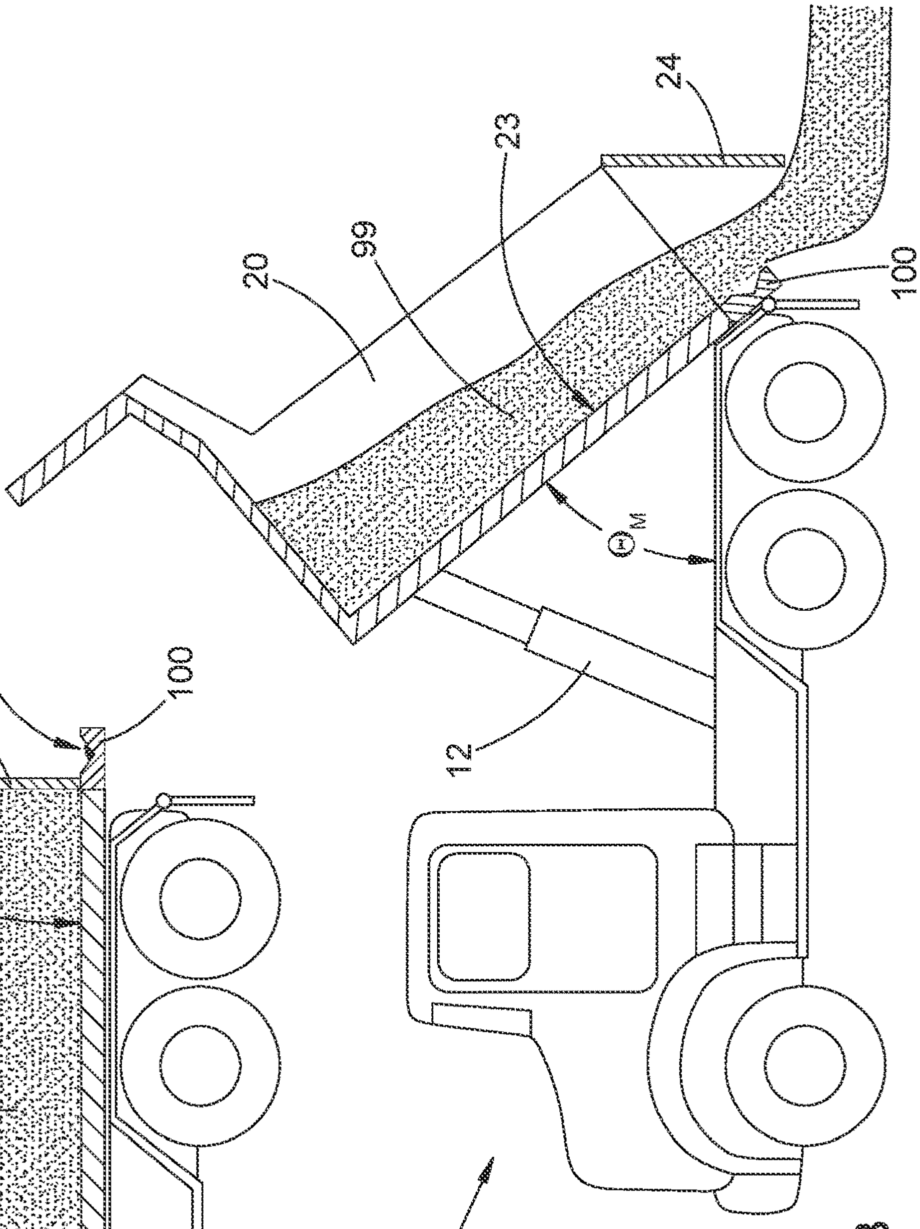
FIG. 3B is a schematic partial cross-sectional side view of the example dump truck of FIGS. 1A-1C dumping a load of material from the dump body in its raised dumping position.
Figure 4A:
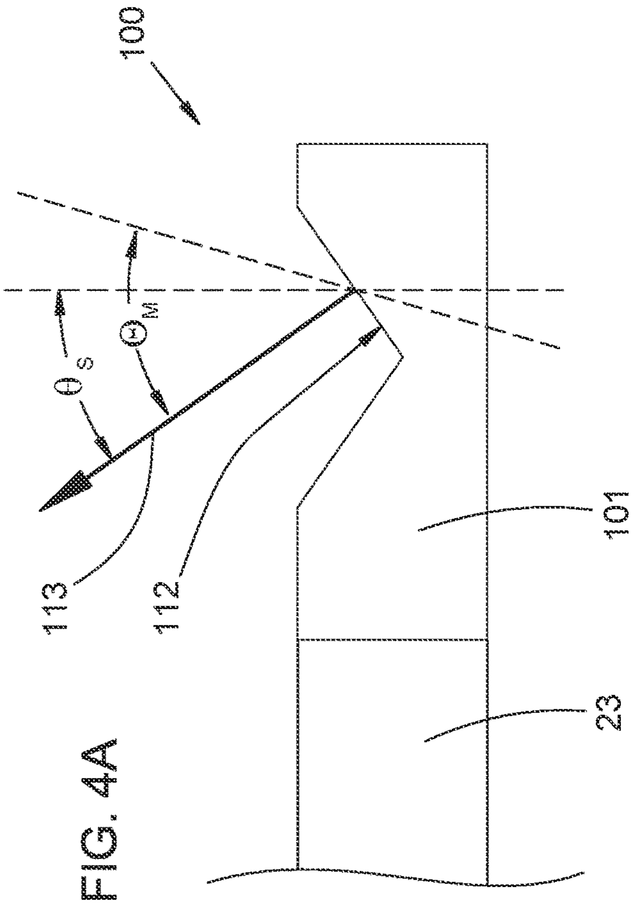
FIGS. 4A-6B illustrate schematically three different example debris-retention surfaces and their corresponding surface-normal vectors, with the dump body in its lowered driving position (FIGS. 4A, 5A, and 6A) and in its raised dumping position (FIGS. 4B, 5B, and 6B).
Figure 4B:
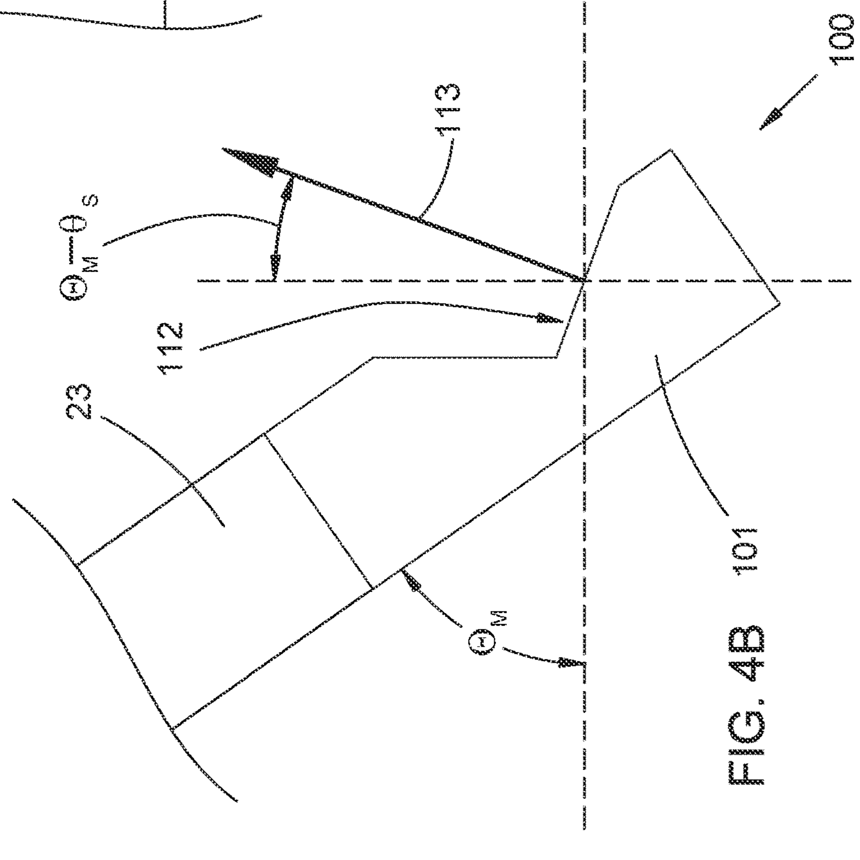
Figure 5A:
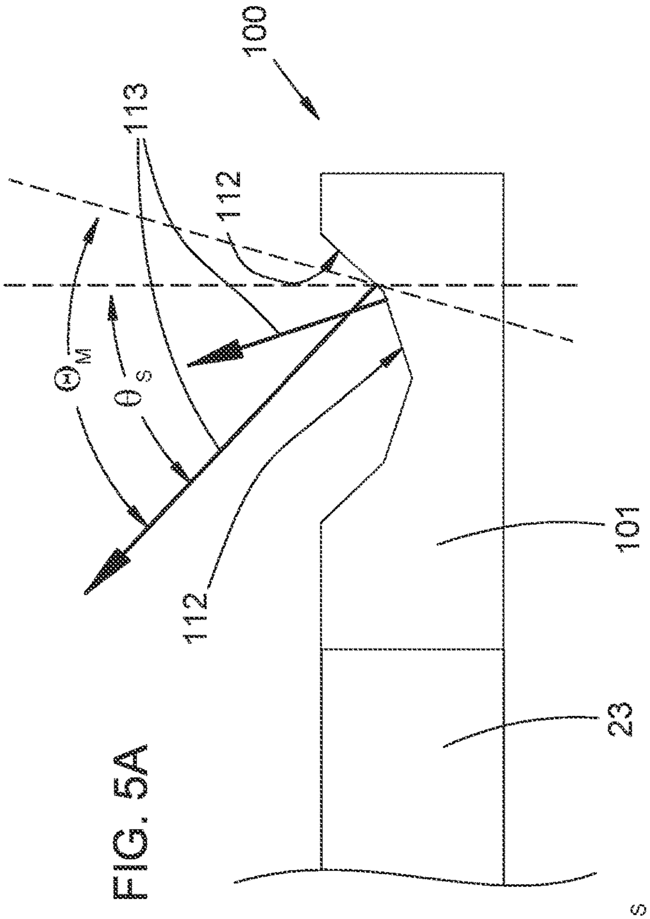
Figure 5B:
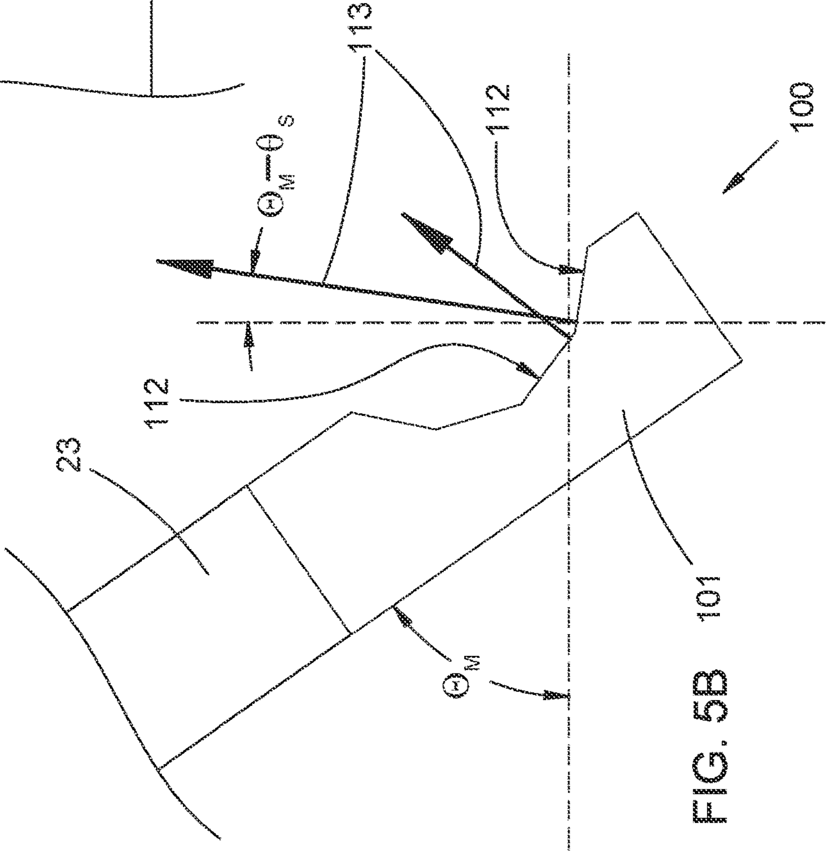
Figure 6A:
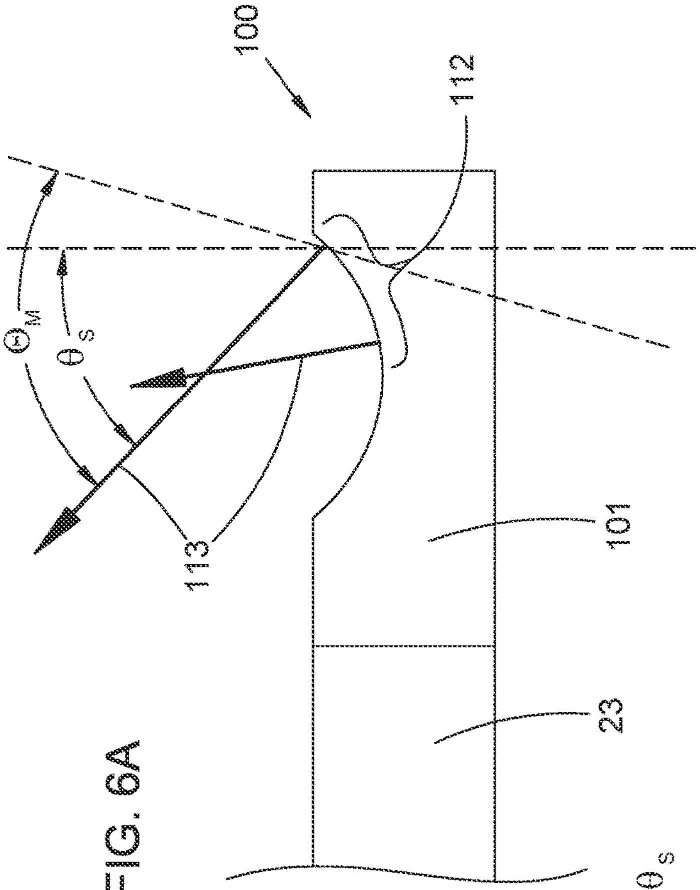
Figure 6B:
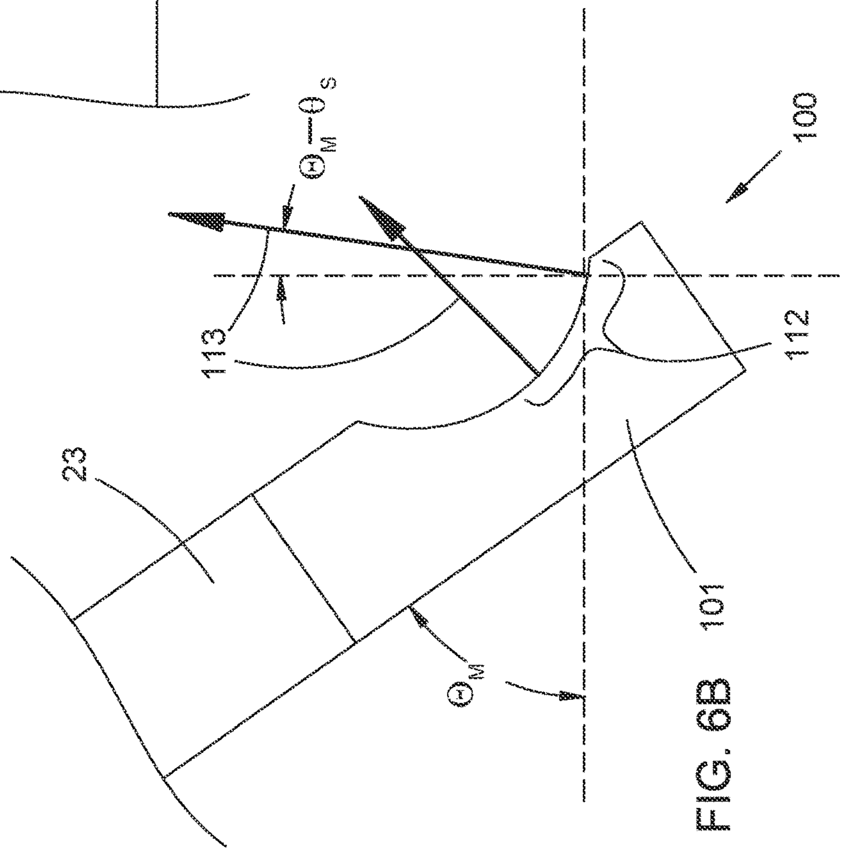

The tailgate 24 is attached to the rear of the dump body 20 and can move between an open position and a closed position; in the closed position the tailgate 24 covers the rear opening 22 and retains the material 99 within the dump body 20 (e.g., as in FIG. 3A). A common arrangement is a hinged connection between the top of the tailgate 24 and a top rear portion of the dump body 20 (e.g., in the closed position in FIGS. 1A and 2A; in the open position in FIGS. 1B and 2B); such an arrangement enables the tailgate 24 to remain closed with the dump body 20 in the lowered driving position (e.g., as in FIG. 3A) and to swing open as the dump body 20 moves into the raised dumping position to dump the material 99 (e.g., as in FIG. 3B). Another common arrangement is a tailgate that slides vertically between the open and closed positions (not shown) and is moved by an actuator of any suitable type or arrangement (e.g., a hydraulic actuator). The elevation angle between the dump body 20 and a horizontal plane can vary from 0° in the lowered driving position to a maximum dump body elevation angle $\Theta_M$. The maximum elevation angle $\theta_M$ can vary from one truck to the next, and often falls between about 45° and about 60°.

A common problem encountered during use of a dump truck to transport material such as rocks or gravel is leakage of some material 99 past the closed tailgate 24 to become debris 98. In some instances, tolerances of the fit of the tailgate 24 against the dump body 20 might not be sufficiently tight to prevent such leakage. In some instances, wear or damage might degrade the fit of the tailgate 24 against the dump body 20, leaving gaps for material to escape. Such leaked material debris 98 is a hazard to other vehicles that share the road with the dump truck as it is driven from one location to the next. Particularly at highway speeds, rocks or gravel flying out of the back of the traveling dump truck can do considerable damage to auto glass, auto body parts, and paint, not to mention human operators of the other vehicles. Various examples of previous debris catchers are disclosed in the references listed in the background section. Each of those can be effective to varying degrees for retaining debris that has leaked out of the dump body 20 past the closed tailgate 24, so that the leaked debris 98 remains on the back end of the dump body and does not fly off and hit other vehicles. However, all of those previous devices must be moved out of the way, or removed entirely from the dump body 20, before the material 99 can be dumped, which can be difficult and time consuming (and therefore often also expensive).

It would be desirable to provide a debris catcher that can retain leaked material debris 98 on the back end of the dump body 20 while the truck is driven, but that also permits the material load 99 to be dumped from the dump body 20 while remaining fixed in place rigidly attached to the dump body 20.

An inventive debris catcher 100 for the dump body 10 comprises a transversely elongated rigid member 101 that is rigidly attached to the dump body 20 (e.g., as in FIGS. 1A-1C, 2A, and 2B). The rigid member 101 extends at least partly across a lower edge of the rear opening 22 of the dump body 20; in some examples the rigid member 101 extends entirely across the rear opening 22. The rigid member 101 is positioned just outside the closed tailgate 24, i.e., rearward of the tailgate 24 with the tailgate 24 in its closed position. The rigid member 101 includes a debris-retention surface 112 that extends at least partly across the rear opening 22 of the dump body 20; in some examples the debris-retention surface 112 can extend entirely across the rear opening 22.

With the dump body 20 in its lowered driving position and the tailgate 24 in its closed position, arrangement of the debris-retention surface 112 of the elongated rigid member 101 retains debris 98 (if any) between the tailgate 24 and the debris-retention surface 112. With the dump body 20 in its raised dumping position and the tailgate 24 in its open position, arrangement of the debris-retention surface 112 permits the material content 99 of the dump body 20 to slide out of the rear opening 22 of the dump body 20 over or past the rigid member 101.

To achieve those results, the debris-retention surface 112 is arranged in a generally upward- and forward-facing orientation with the dump body 20 in its lowered driving position (to retain the debris 98), but in a generally upward- and rearward-facing orientation with the dump body 20 in its raised dumping position (to allow the material 99 to slide out over or past the rigid member 101). Expressed more quantitatively, the debris-retention surface is characterized by one or more surface-normal vectors 113 (see FIGS. 4A-6B). With the dump body 20 in its lowered driving position, each of those surface-normal vectors 113 has a corresponding non-zero horizontal component directed in a forward direction (as in FIGS. 4A, 5A, and 6A); with the dump body 20 in its raised dumping position, each of those surface-normal vectors 113 has a corresponding non-zero horizontal component directed in a rearward direction (e.g., as in FIGS. 4B, 5B, and 6B). Referring to FIGS. 4A-6B, the largest forward angle $\theta_S$ formed by any of the surface-normal vectors 113 with respect to the vertical direction, with the dump body 20 in its lowered driving position, should be less than the maximum dump angle $\Theta_M$ (i.e., $\theta S<\Theta_M$), so that with the dump body 20 in its raised dumping position, all of the surface normal wavevectors 113 are rotated beyond vertical and therefore have non-zero horizonal components directed in the rearward direction.

Figure 7A:
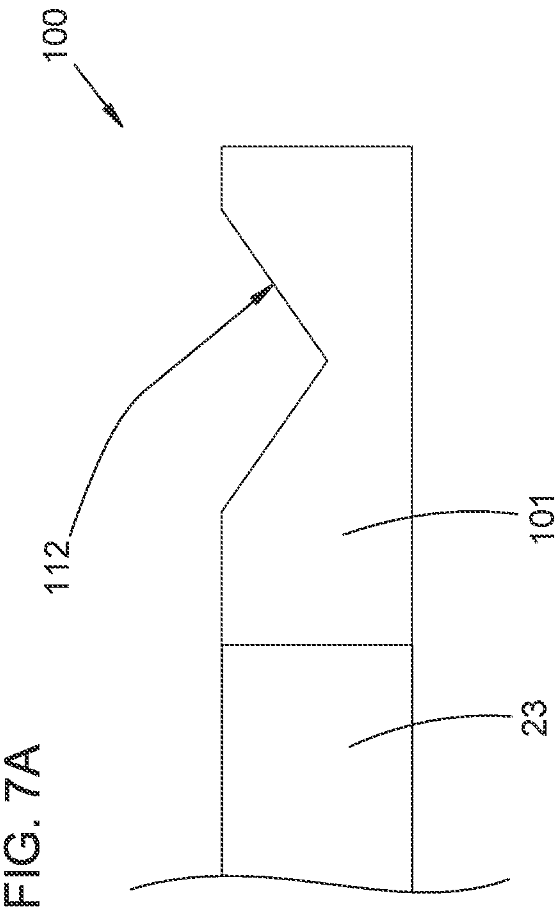
FIGS. 7A-9B illustrate schematically three different example flat debris-retention surfaces, with the dump body in its lowered driving position (FIGS. 7A, 8A, and 9A) and in its raised dumping position (FIGS. 7B, 8B, and 9B).
Figure 13A:
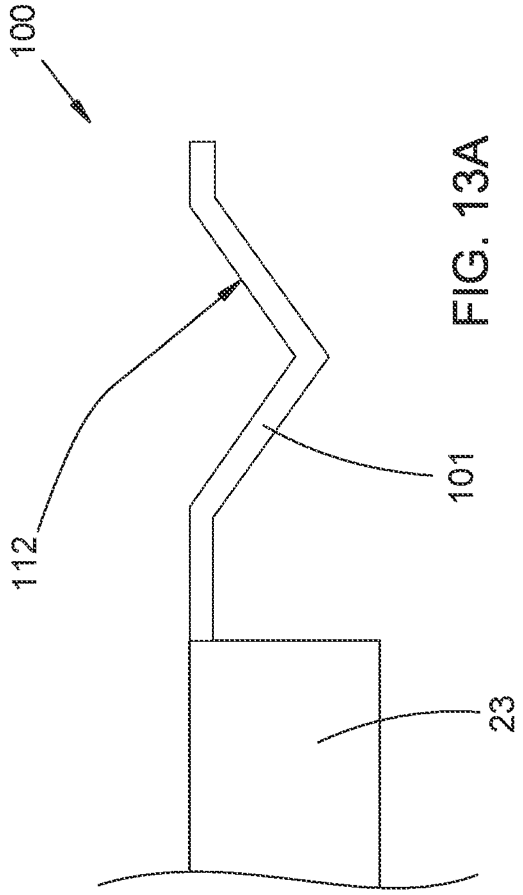
FIGS. 13A and 13B illustrate schematically alternate construction of the examples of FIGS. 7A/7B and 10A/10B, respectively.
Figure 7B:
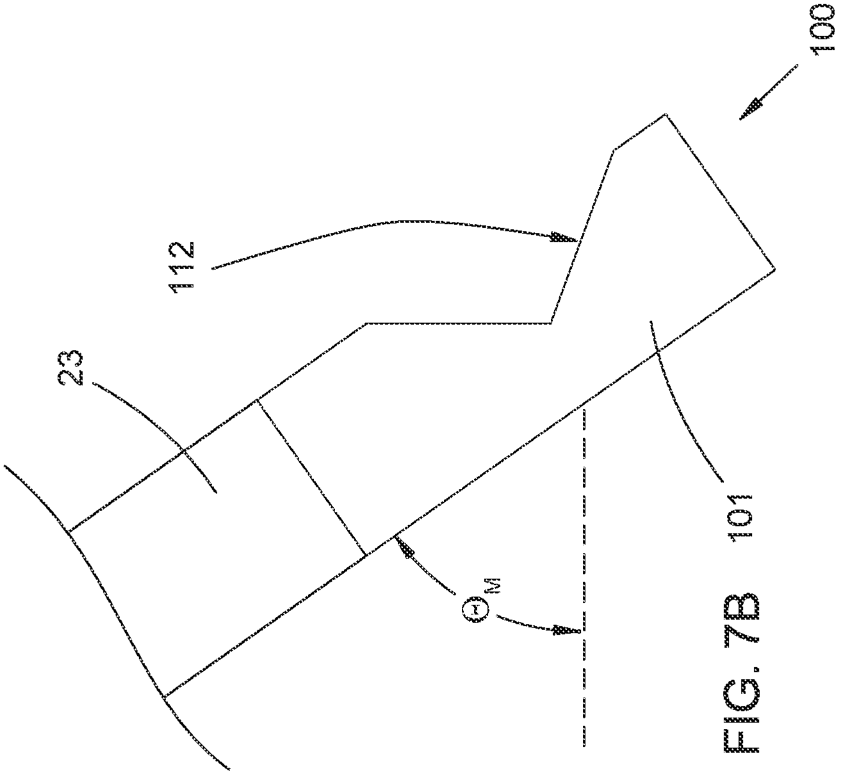
Figure 8A:
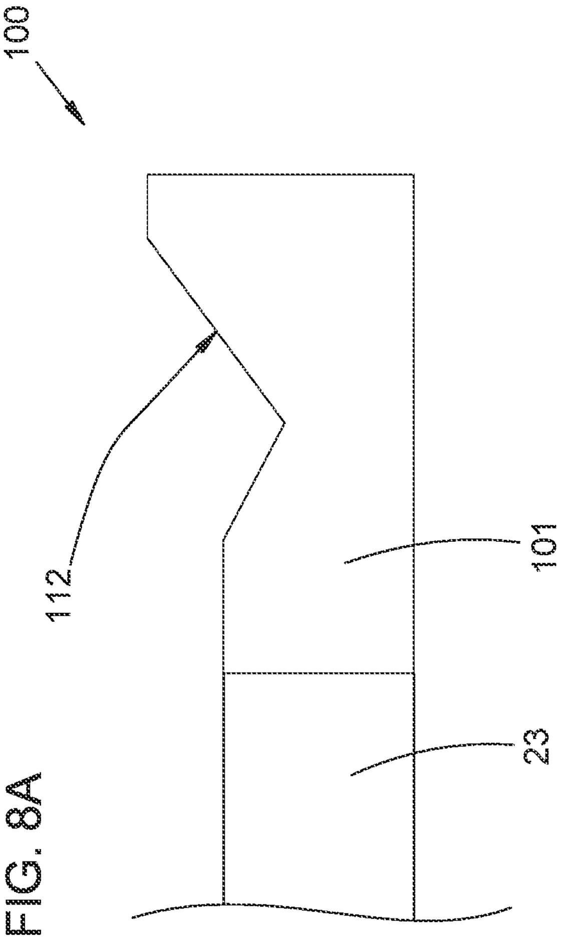
Figure 8B:
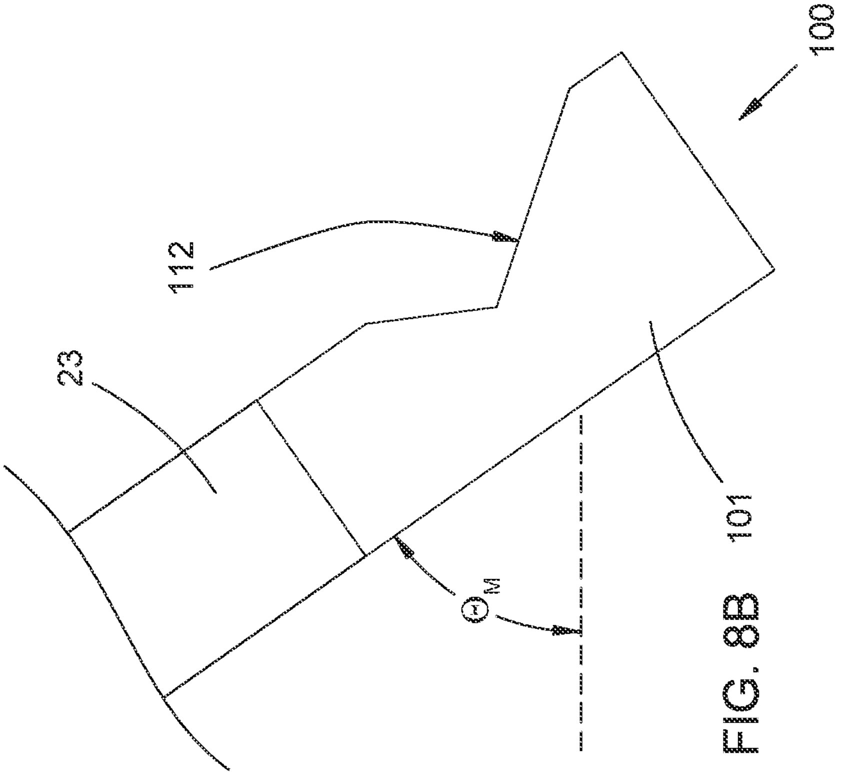
Figure 9A:
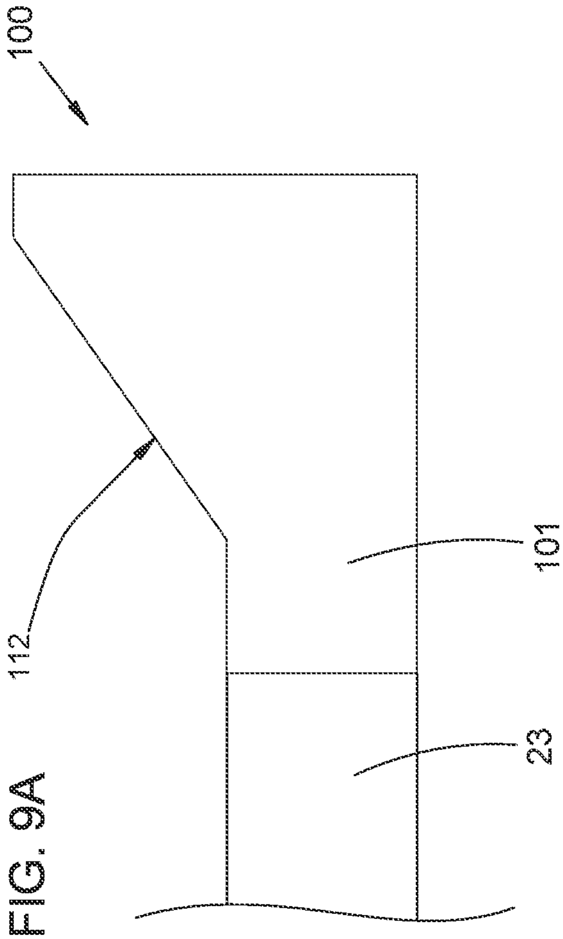
Figure 9B:
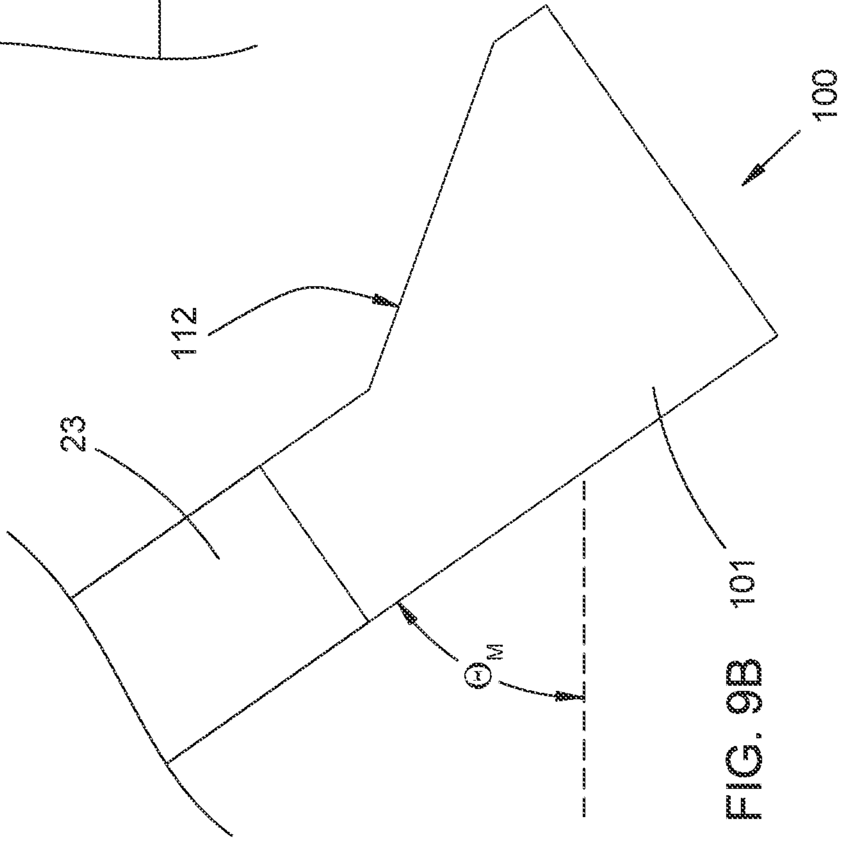
Figure 10A:
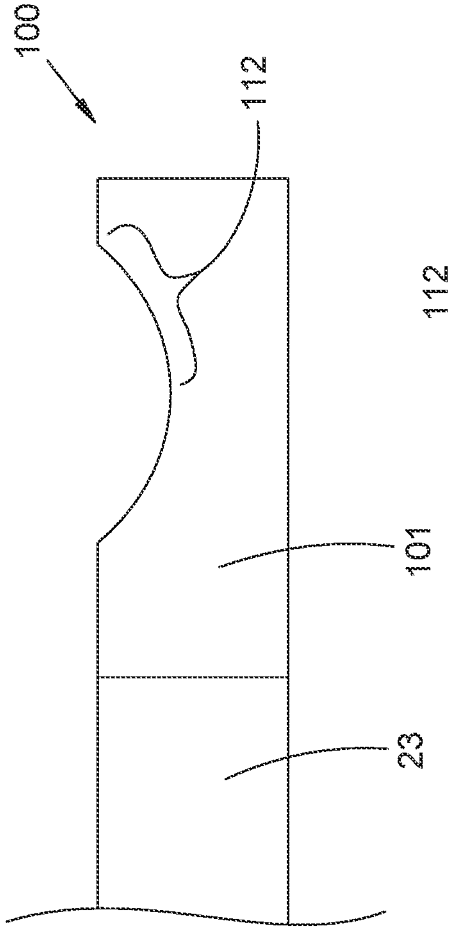
FIGS. 10A-12B illustrate schematically three different example curved debris-retention surfaces, with the dump body in its lowered driving position (FIGS. 10A, 11A, and 12A) and in its raised dumping position (FIGS. 10B, 11B, and 12B).
Figure 13B:
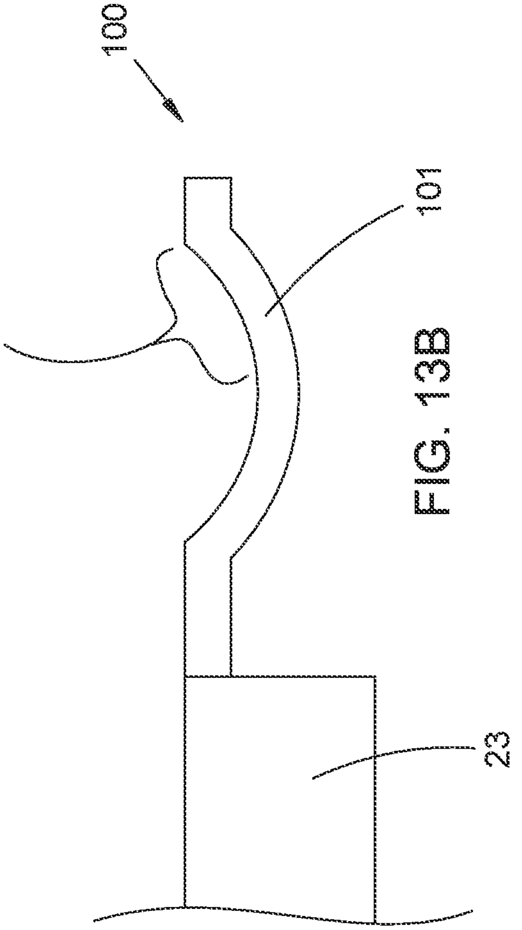
Figure 10B:
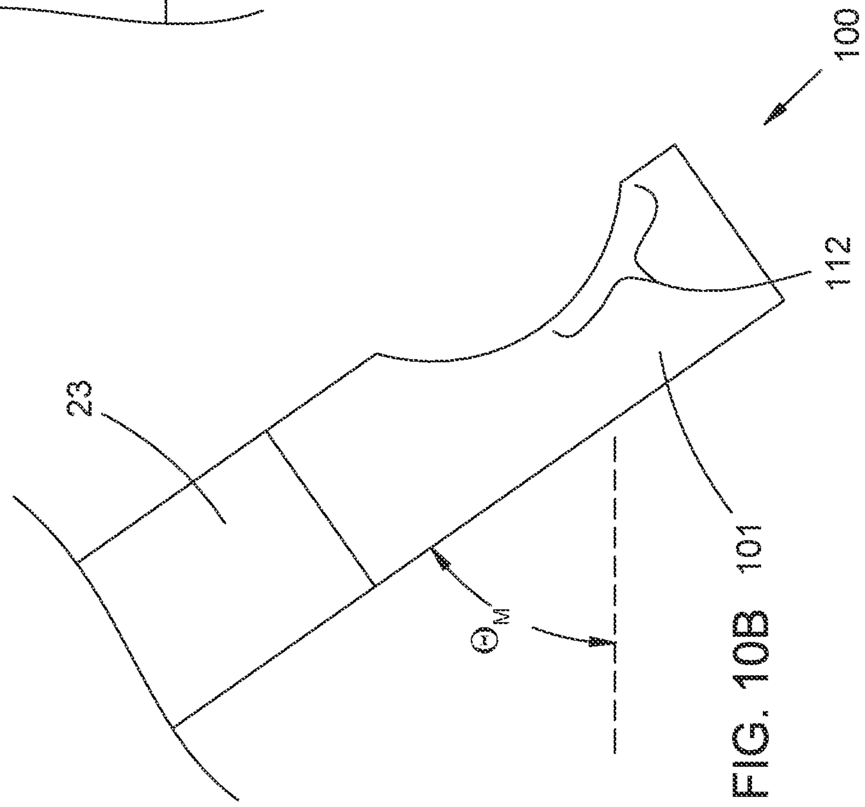
Figure 11A:
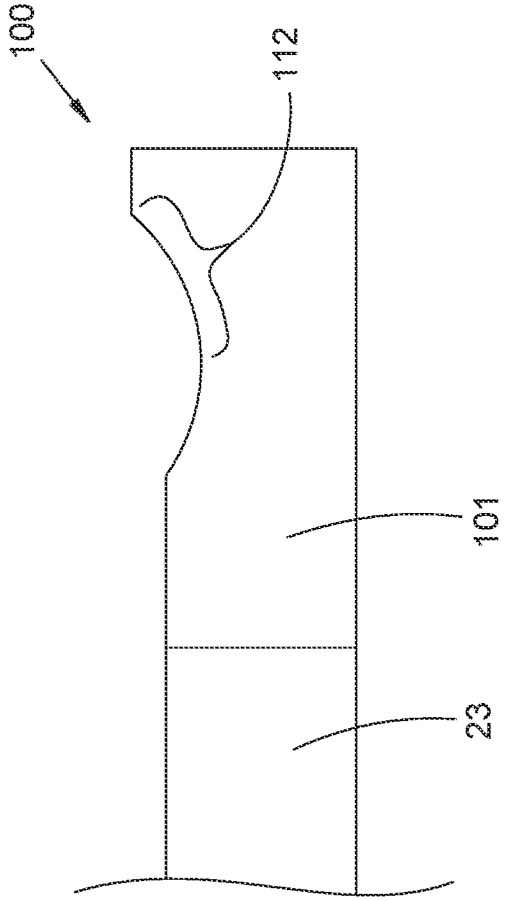
Figure 11B:
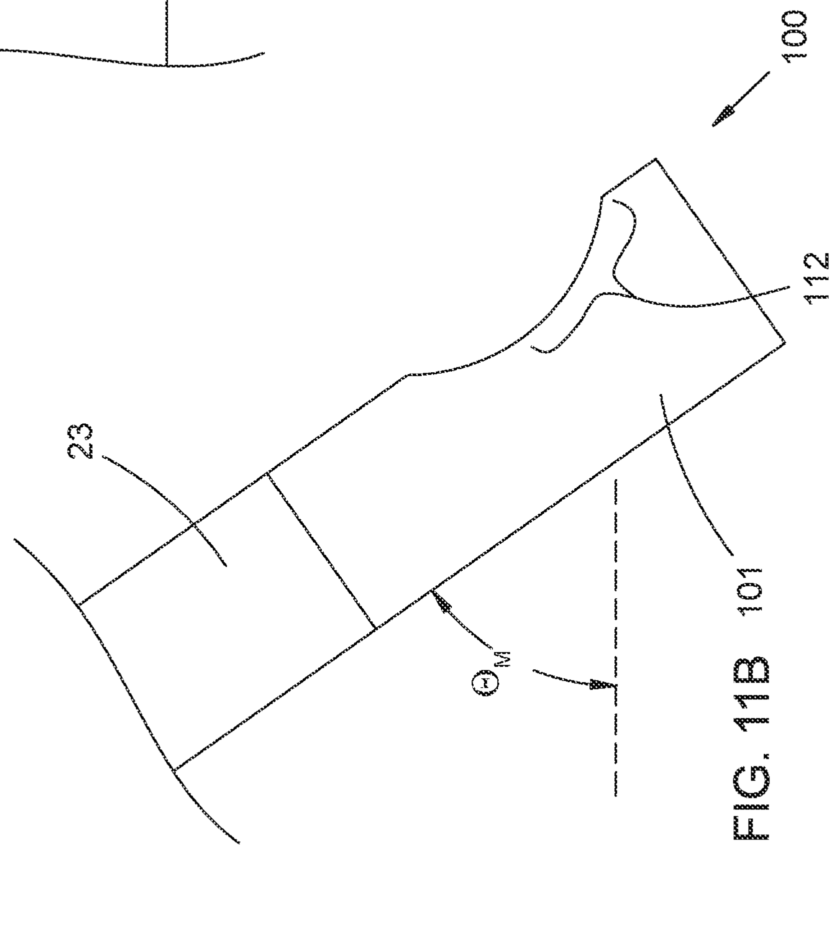
Figure 12A:
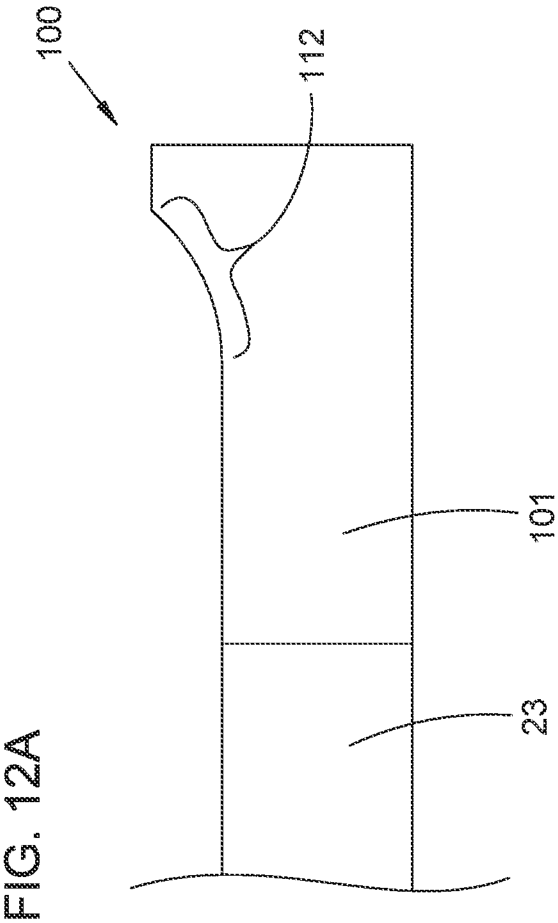
Figure 12B:
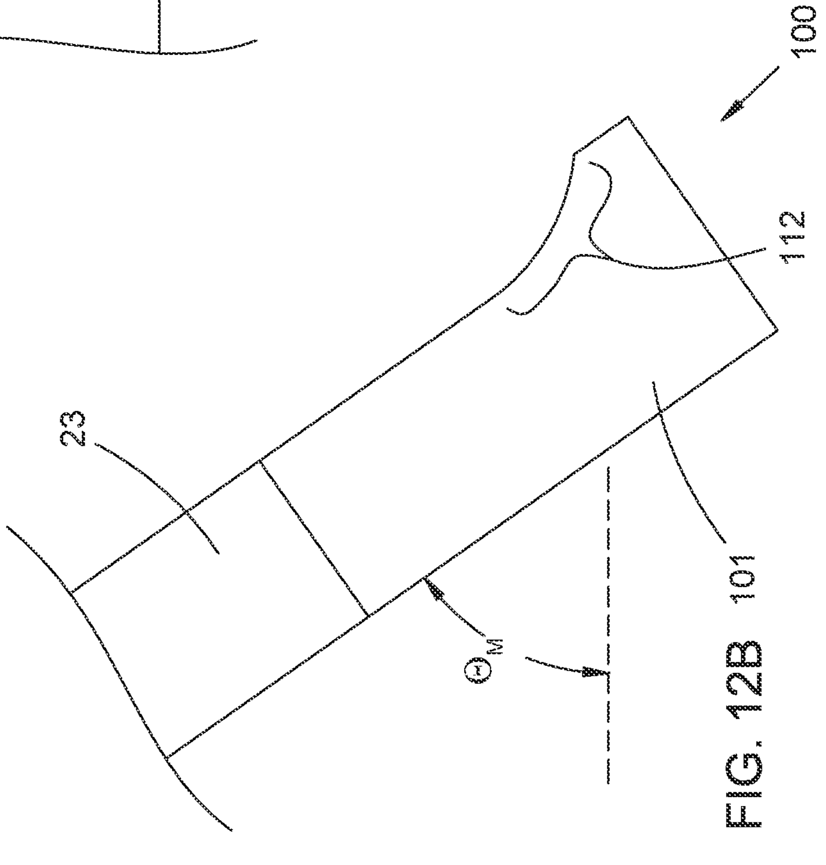

In some examples (e.g., FIGS. 1A-3B, 4A, 4B, 7A-9B, and 13A), the debris-retention surface 112 can include only a single flat surface, which can be characterized by a single surface-normal vector. In some of those examples (e.g., FIGS. 1A-3B and 7A-8B, and 13A) the rigid member 112 can include a V-shaped groove, and the debris-retention surface can form a rearward surface of the V-shaped groove. In some examples (FIGS. 5A and 5B), the debris-retention surface 112 can include multiple flat surfaces, each characterized by its own surface-normal vector 113, etc. In some examples (e.g., FIGS. 6A, 6B, 10A-12B, and 13B), the debris-retention surface 112 can include at least one curved surface characterized by a continuous range of surface-normal vectors 113. In some of those examples (e.g., FIGS. 10A-11B and 13B) the rigid member can include a flattened U-shaped groove, with the debris-retention surface 112 forming a rearward portion of the flattened U-shaped groove. Note that FIGS. 13A and 13B schematically illustrate alternate construction of the examples of FIGS. 7A/7B and 10A/10B, respectively. Analogous alternate construction can be applied to the other depicted examples. In some examples the rigid member 101 can include end caps or end walls 107 attached to or formed at each end of the rigid member 101 (shown only in FIG. 1C; omitted from FIGS. 1A and 1B). Such end walls or end caps can be arranged so as to impeded movement of the debris 98 (if any) off of the ends of the rigid member 101. In some examples such end walls or end caps can expend vertically upward from the ends of the rigid member 101. In some examples in which the rigid member 101 includes a groove, the end walls or end caps can be arranged to close off the ends of the groove.

In some examples the debris-retention surface 112 can be characterized by a cross-section that remains constant with respect to position across at least a portion, or all, of the rear opening 22 of the dump body 20. In some examples the debris-retention surface 112 can be characterized by a cross-section that varies with respect to position across at least a portion, or all, of the rear opening 22 of the dump body 20.

In some examples, including all of those shown in the drawings, no portion of the rigid member 101 forward of the debris-retention surface 112 extends upward past a plane that is defined by the interior surface of the bed portion 23 of the dump body 20 (with the dump body in its lowered driving position). In other words, the front portion of the rigid member can be flush with or lower than the interior surface of the bed portion 23 of the dump body 20, so that the material 99 can flow out of the dump body 20 unimpeded when the dump body 20 moves to its raised dumping position. In some examples, including all of those shown in the drawings, no portion of the rigid member 101 rearward of the debris-retention surface 112 extends upward past a plane that is (i) parallel to the interior surface of the bed portion 23 of the dump body 20 (with the dump body 20 in its lowered driving position) and (ii) coincident with a top edge of the debris-retention surface. In other words, a rear portion of the rigid member 101 can be flush with or lower than the rearward top edge of the debris-retention surface 112, so that the material 99 can flow out of the dump body 20 unimpeded when the dump body moves to its raised dumping position.

In some examples (e.g., FIGS. 7A, 7B, 10A, and 10B), no portion of the debris-retention surface 112 extends upward past a plane defined by the interior surface of the bed portion 23 of the dump body 20 (with the dump body in its lowered driving position). In some examples (e.g., FIGS. 8A-9B and 11A-12B), at least a portion of the debris-retention surface 112 extends upward past a plane defined by the interior surface of the bed portion 23 of the dump body 20 (with the dump body 20 in its lowered driving position).

In some examples the rigid member 101 can be integrally formed with the bed portion 23 of the dump body 20. In some examples the rigid member 101 can be permanently attached to the dump body 20, e.g., by welding or riveting. In some examples the rigid member 101 can be removeably attached to the dump body 20, e.g., by nuts and bolts. Although removeable, such a rigid member 101 is nevertheless intended to remain rigidly attached to the dump body 20 while the material 99 is dumped from the dump body 20. The rigid member 101 can comprise any one or more suitably strong, suitably rigid materials, including, e.g., materials used for constructing the dump body 20 such as steel or aluminum.

An example of an inventive method for using a dump body 20 that includes an inventive debris catcher begins with driving the truck 10 including the dump body 20 with (i) the dump body 20 in its lowered driving position, (ii) the tailgate 24 in its closed position, and (iii) a load of material 99 in the dump body 20. While driving the truck 10, at least some of the material 99 of the load leaks as debris 98 out of the dump body 20 past the tailgate 24 and is retained between the tailgate 20 and the debris-retention surface 112. At a dumping destination, the material 99 is dumped from the dump body 20 by raising the dump body 20 into the raised dumping position so that the material 99 slides out of the rear opening 22 of the dump body 20 past the open tailgate 24 and over or past the rigid member 101. Any debris 98 that is present is dumped as well. The material 99 can be dumped while leaving the rigid member 101 rigidly attached to the dump body 20 in its fixed position for retaining the debris 98. No movement or removal of the rigid member 101 is needed to enable dumping.

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. A debris catcher for a dump body, the debris catcher comprising a transversely elongated rigid member that is rigidly attached to the dump body, (a) the rigid member extending at least partly across a lower edge of a rear opening of the dump body; (b) the rigid member being positioned, with a tailgate of the dump body in a closed position, rearward of a lower edge of the tailgate; and (c) the rigid member having a debris-retention surface extending at least partly across the lower edge of the rear opening of the dump body and being characterized by one or more surface-normal vectors, each of which (i) with the dump body in a lowered driving position, has a corresponding non-zero horizontal component directed in a forward direction, and (ii) with the dump body in a raised dumping position, has a corresponding non-zero horizontal component directed in a rearward direction.

Example 2. The debris catcher of Example 1, the debris-retention surface being arranged so that (i) with the dump body in the lowered driving position and the tailgate in the closed position, the rigid member retains debris between the tailgate and the debris-retention surface, and (ii) with the dump body in the raised dumping position and the tailgate in an open position, the debris-retention surface permits the contents of the dump body to slide out of the rear opening of the dump body over or past the rigid member.

Example 3. The debris catcher of any one of Examples 1 or 2, the rigid member extending entirely across the lower edge of the rear opening of the dump body.

Example 4. The debris catcher of any one of Examples 1 through 3, the debris-retention surface extending entirely across the lower edge of the rear opening of the dump body.

Example 5. The debris catcher of any one of Examples 1 through 4, no portion of the rigid member forward of the debris-retention surface extending upward past a plane that is defined by an interior surface of a bed portion of the dump body in the lowered driving position.

Example 6. The debris catcher of any one of Examples 1 through 5, no portion of the rigid member rearward of the debris-retention surface extending upward past a plane that is (i) parallel to an interior surface of a bed portion of the dump body in the lowered driving position and (ii) coincident with a top edge of the debris-retention surface.

Example 7. The debris catcher of any one of Examples 1 through 6, no portion of the debris-retention surface extending upward past a plane defined by an interior surface of a bed portion of the dump body in the lowered driving position.

Example 8. The debris catcher of any one of Examples 1 through 6, at least a portion of the debris-retention surface extending upward past a plane defined by an interior surface of a bed portion of the dump body in the lowered driving position.

Example 9. The debris catcher of any one of Examples 1 through 8, the rigid member including an elongated groove or depression in a top surface of the elongated member, the debris-retention surface forming a rearward portion of the elongated groove or depression.

Example 10. The debris catcher of any one of Examples 1 through 9, the debris-retention surface including only a single flat surface.

Example 11. The debris catcher of Example 10, the debris-retention surface forming a rearward portion of a V-shaped groove.

Example 12. The debris catcher of any one of Examples 1 through 9, the debris-retention surface including multiple flat surfaces.

Example 13. The debris catcher of any one of Examples 1 through 9, the debris-retention surface including at least one curved surface.

Example 14. The debris catcher of Example 13, the debris-retention surface forming a rearward portion of a flattened U-shaped groove.

Example 15. The debris catcher of any one of Examples 1 through 14, the debris-retention surface being characterized by a cross-section that remains constant with respect to position across at least a portion of the lower edge of the rear opening of the dump body.

Example 16. The debris catcher of any one of Examples 1 through 14, the debris-retention surface being characterized by a cross-section that varies with respect to position across at least a portion of the lower edge of the rear opening of the dump body.

Example 17. The debris catcher of any one of Examples 1 through 16, the rigid member further comprising end walls or end caps positioned at the end of the rigid member arranged so as to impede transverse movement of the retained debris off of the end of the rigid member.

Example 18. The debris catcher of any one of Examples 1 through 17, the rigid member being integrally formed with a bed portion of the dump body.

Example 19. The debris catcher of any one of Examples 1 through 17, the rigid member being permanently attached to the dump body.

Example 20. The debris catcher of any one of Examples 1 through 17, the rigid member being removeably attached to the dump body.

Example 21. A method for using a dump body of a truck, the dump body including the debris catcher of any one of Examples 1 through 20, the method comprising: (A) driving the truck including the dump body with (i) the dump body in the lowered driving position, (ii) the tailgate in the closed position, and (iii) a load of material in the dump body; (B) while driving the truck in part (A), retaining between the tailgate and the debris-retention surface at least some of the material of the load that leaks as debris out of the dump body past the tailgate; and (C) after driving the truck in part (A), dumping the material from the dump body by raising the dump body into the raised dumping position so that the material slides out of the rear opening of the dump body past the tailgate in an open position and over or past the rigid member.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features-which features are shown, described, or claimed in the present application-including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words “comprising,” “including,” “having,” and variants thereof, wherever they appear, shall be construed as open-ended terminology, with the same meaning as if a phrase such as “at least” were appended after each instance thereof, unless explicitly stated otherwise. The article “a” shall be interpreted as “one or more” unless “only one,” “a single,” or other similar limitation is stated explicitly or is implicit in the particular context; similarly, the article “the” shall be interpreted as “one or more of the” unless “only one of the,” “a single one of the,” or other similar limitation is stated explicitly or is implicit in the particular context. The conjunction “or” is to be construed inclusively unless: (i) it is explicitly stated otherwise, e.g., by use of “either . . . or,” “only one of,” or similar language; or (ii) two or more of the listed alternatives are understood or disclosed (implicitly or explicitly) to be incompatible or mutually exclusive within the particular context. In that latter case, “or” would be understood to encompass only those combinations involving non-mutually-exclusive alternatives. In one example, each of “a dog or a cat,” “one or more of a dog or a cat,” and “one or more dogs or cats” would be interpreted as one or more dogs without any cats, or one or more cats without any dogs, or one or more of each.

For purposes of the present disclosure or appended claims, when a numerical quantity is recited (with or without terms such as “about,” “about equal to,” “substantially equal to,” “greater than about,” “less than about,” and so forth), standard conventions pertaining to measurement precision, rounding error, and significant digits shall apply, unless a differing interpretation is explicitly set forth, or if a differing interpretation is implicit or inherent (e.g., some small integer quantities). For null quantities described by phrases such as “equal to zero,” “absent,” “eliminated,” “negligible,” “prevented,” and so forth (with or without terms such as “about,” “substantially,” and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as “parallel,” “perpendicular,” “orthogonal,” “flush,” “aligned,” and so forth shall be similarly interpreted (with or without terms such as “about,” “substantially,” and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112 (f) are desired to be invoked in an apparatus claim, then the word “means” will appear in that apparatus claim. If those provisions are desired to be invoked in a method claim, the words “a step for” will appear in that method claim. Conversely, if the words “means” or “a step for” do not appear in a claim, then the provisions of 35 USC § 112 (f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A debris catcher for a dump body, the debris catcher comprising a transversely elongated rigid member that is rigidly attached to the dump body, (a) the rigid member extending at least partly across a lower edge of a rear opening of the dump body;

(b) the rigid member being positioned, with a tailgate of the dump body in a closed position, rearward of a lower edge of the tailgate; and (c) the rigid member having a debris-retention surface extending at least partly across the lower edge of the rear opening of the dump body and being characterized by one or more surface-normal vectors, each of which (i) with the dump body in a lowered driving position, has a corresponding non-zero horizontal component directed in a forward direction, and (ii) with the dump body in a raised dumping position, has a corresponding non-zero horizontal component directed in a rearward direction.

2. The debris catcher of claim 1, the debris-retention surface being arranged so that (i) with the dump body in the lowered driving position and the tailgate in the closed position, the rigid member retains debris between the tailgate and the debris-retention surface, and (ii) with the dump body in the raised dumping position and the tailgate in an open position, the debris-retention surface permits the contents of the dump body to slide out of the rear opening of the dump body over or past the rigid member.

3. The debris catcher of claim 1, the rigid member extending entirely across the lower edge of the rear opening of the dump body.

4. The debris catcher of claim 1, the debris-retention surface extending entirely across the lower edge of the rear opening of the dump body.

5. The debris catcher of claim 1, no portion of the rigid member forward of the debris-retention surface extending upward past a plane that is defined by an interior surface of a bed portion of the dump body in the lowered driving position.

6. The debris catcher of claim 1, no portion of the rigid member rearward of the debris-retention surface extending upward past a plane that is (i) parallel to an interior surface of a bed portion of the dump body in the lowered driving position and (ii) coincident with a top edge of the debris-retention surface.

7. The debris catcher of claim 1, no portion of the debris-retention surface extending upward past a plane defined by an interior surface of a bed portion of the dump body in the lowered driving position.

8. The debris catcher of claim 1, at least a portion of the debris-retention surface extending upward past a plane defined by an interior surface of a bed portion of the dump body in the lowered driving position.

9. The debris catcher of claim 1, the rigid member including an elongated groove or depression in a top surface of the elongated member, the debris-retention surface forming a rearward portion of the elongated groove or depression.

10. The debris catcher of claim 1, the debris-retention surface including only a single flat surface.

11. The debris catcher of claim 1, the debris-retention surface including multiple flat surfaces.

12. The debris catcher of claim 1, the debris-retention surface including at least one curved surface.

13. The debris catcher of claim 1, the debris-retention surface being characterized by a cross-section that remains constant with respect to position across at least a portion of the lower edge of the rear opening of the dump body.

14. The debris catcher of claim 1, the debris-retention surface being characterized by a cross-section that varies with respect to position across at least a portion of the lower edge of the rear opening of the dump body.

15. The debris catcher of claim 1, the debris-retention surface forming a rearward portion of a V-shaped groove.

16. The debris catcher of claim 1, the debris-retention surface forming a rearward portion of a flattened U-shaped groove.

17. The debris catcher of claim 1, the rigid member further comprising end walls or end caps positioned at the end of the rigid member arranged so as to impede transverse movement of the retained debris off of the end of the rigid member.

18. The debris catcher of claim 1, the rigid member being integrally formed with a bed portion of the dump body.

19. The debris catcher of claim 1, the rigid member being permanently attached to the dump body.

20. The debris catcher of claim 1, the rigid member being removeably attached to the dump body.

21. A method for using a dump body of a truck wherein:

(a) the dump body includes a debris catcher comprising a transversely elongated rigid member that is rigidly attached to the dump body;

(b) the rigid member extends at least partly across a lower edge of a rear opening of the dump body;

(c) the rigid member is positioned, with a tailgate of the dump body in a closed position, rearward of a lower edge of the tailgate; and (d) the rigid member has a debris-retention surface extending at least partly across the lower edge of the rear opening of the dump body and being characterized by one or more surface-normal vectors, each of which (i) with the dump body in a lowered driving position, has a corresponding non-zero horizontal component directed in a forward direction, and (ii) with the dump body in a raised dumping position, has a corresponding non-zero horizontal component directed in a rearward direction, the method comprising:

(A) driving the truck including the dump body with (i) the dump body in the lowered driving position, (ii) the tailgate in the closed position, and (iii) a load of material in the dump body;

(B) while driving the truck in part (A), retaining between the tailgate and the debris-retention surface at least some of the material of the load that leaks as debris out of the dump body past the tailgate; and (C) after driving the truck in part (A), dumping the material from the dump body by raising the dump body into the raised dumping position so that the material slides out of the rear opening of the dump body past the tailgate in an open position and over or past the rigid member.

* * * * *